United States Patent [19]
Kobayashi et al.

[11] Patent Number: 6,046,791
[45] Date of Patent: Apr. 4, 2000

[54] POLYMER DISPERSED LIQUID CRYSTAL ELECTRO-OPTICAL DEVICE AND METHOD FOR MANUFACTURING THE SAME

[75] Inventors: Hidekazu Kobayashi; Shuhei Yamada, both of Nagano-ken, Japan

[73] Assignee: Seiko Epson Corporation, Tokyo, Japan

[21] Appl. No.: 08/860,621

[22] PCT Filed: Nov. 11, 1996

[86] PCT No.: PCT/JP96/03303

§ 371 Date: Jul. 9, 1997

§ 102(e) Date: Jul. 9, 1997

[87] PCT Pub. No.: WO97/17630

PCT Pub. Date: May 15, 1997

[30] Foreign Application Priority Data

Nov. 10, 1995 [JP] Japan ..................... 7-292821

[51] Int. Cl.[7] .............. G02F 1/13; C09K 19/02
[52] U.S. Cl. ............ 349/193; 349/183; 349/184; 349/185; 349/186; 349/188; 349/191; 349/92; 430/20; 428/1.1
[58] Field of Search .............. 428/1; 359/103, 359/106; 430/20; 349/183, 184, 185, 186, 188, 191, 193, 194, 195, 196, 197, 198, 199, 200, 201, 202, 92

[56] References Cited

U.S. PATENT DOCUMENTS 3,600,060  8/1971  Churchill et al. .
5,225,104  7/1993  Van Steenkiste et al. .................. 428/1
5,494,604  2/1996  Chung ........................................ 428/1

FOREIGN PATENT DOCUMENTS

| 511 9320 | 2/1993 | Japan . |
|---|---|---|
| 5-117324 | 5/1993 | Japan . |
| 7-138569 | 5/1995 | Japan . |
| 7-504763 | 5/1995 | Japan . |
| 7-146459 | 6/1995 | Japan . |
| 7-175051 | 7/1995 | Japan . |
| 8-231647 | 9/1996 | Japan . |
| WO 94/25508 | 11/1994 | WIPO . |

*Primary Examiner*—Susan W. Berman
*Attorney, Agent, or Firm*—Oliff & Berridge, PLC

[57] ABSTRACT

A polymer dispersed liquid crystal electro-optical device comprising a liquid crystal polymer complex layer having a liquid crystal and a polymer, wherein said liquid crystal and said polymer are aligned in the same direction when no electric field is applied, and an electrode structure formed on each side of said liquid crystal polymer complex layer for applying an electric field to said liquid crystal polymer complex layer to align said liquid crystal along the electric field so as to render said liquid crystal polymer complex layer in a light-scattering state. The liquid crystal polymer complex layer is formed by dissolving a liquid crystal and a polymer precursor to form a solution; adding a compound in which at least one hydrogen atom in a benzene ring is substituted by a hydroxy group or a compound having a benzene ring with a hydroxy group as a basic skeleton to said solution; polymerizing said polymer precursor to from a polymer; and phase separating said liquid crystal and said polymer to form a liquid crystal polymer complex layer. The compound improves the initial refractive index, and the refractive index and contrast after energize-aging.

4 Claims, 5 Drawing Sheets

FIG. 5 a (—○—) Added Amount of BHQ; 0 b (—□—) Added Amount of BHQ; 0.001 wt% c (—△—) Added Amount of BHQ; 0.01 wt% d (—×—) Added Amount of BHQ; 0.1 wt% e (—+—) Added Amount of BHQ; 1.0 wt%

POLYMER DISPERSED LIQUID CRYSTAL ELECTRO-OPTICAL DEVICE AND METHOD FOR MANUFACTURING THE SAME

FIELD OF THE INVENTION

The present invention relates to a polymer dispersed liquid crystal electro-optical device, in which a liquid crystal and a polymer are compatibly dispersed, and a method for manufacturing the same.

DESCRIPTION OF RELATED ART

Conventionally, various types of display devices using a liquid crystal display have been popularized, and a majority of the devices employ a liquid crystal display according to a so-called TN (Twisted Nematic) type or a STN (Super Twisted Nematic) type. However, since these liquid crystal displays must use two polarizing plates, as is widely known, efficiency of light availability decreases, thereby disadvantageously causing a dark display.

Therefore, polymer dispersed liquid crystal display devices have been recently developed that do not need polarizing plates by utilizing a difference between a liquid crystal and a polymer. These polymer dispersed liquid crystal electro-optical devices are prepared such that a liquid crystal and a polymer are compatibly dispersed and phase-separated to form a liquid crystal polymer complex layer. These devices are in a transparent state in which light can be transmitted when the refractive indexes of the liquid crystal and the polymer have the same value due to application or removal of an electric field to or from the above-mentioned complex layer. These devices are in a cloudy state (translucent state) in which light is scattered if the refractive indexes are different from each other.

In these devices, a liquid crystal is dispersed in a polymer and the liquid crystal and the polymer are phase-separated to form a liquid crystal polymer complex layer under a condition in which liquid crystal molecules having positive dielectric anisotropy are aligned at random between two transparent substrates, as is described in U.S. Pat. No. 3,600,060 in detail. When no electric field is applied (without applied electric field), the refractive indexes of the randomly aligned liquid crystal and the polymer also aligned at random differ from each other, giving a light-scattering state in the liquid crystal polymer complex layer. Moreover, when an electric field is applied, the liquid crystal is aligned in the direction of the electric field by the electric field, and thus, the difference between the liquid crystal and the polymer disappear so that the liquid crystal polymer complex layer is rendered in a transparent state.

According to such polymer dispersed liquid crystal display devices, micro-particles of a liquid crystal are dispersed in a polymer, and further, the polymer is aligned at random. Thus, sufficient light transmittance cannot be obtained even when the liquid crystal and the polymer have the same refractive index, resulting in an incomplete transparent state. In addition, since the liquid crystal has an uneven particle diameter, the display quality is not uniform, leading to reduced reliability. Moreover, the response of each liquid crystal molecule to an electric field is nonuniform because the liquid crystal is also aligned at random when no electric field is applied. Thus, a problem occurs in that the threshold characteristics of transmittance of the device as a whole is not rapid.

Therefore, as is described in Japanese Patent Laid-Open No. 5-119302 and the like, a polymer dispersed liquid crystal display device has been proposed according to a system in which a sufficient light-transmitting state is achieved when no electric field is applied because a liquid crystal and a polymer are aligned in the same direction so that they have almost the same refractive index. A light-scattering state is achieved when an electric field is applied because only the liquid crystal is aligned in the direction along the electric field so that the refractive indexes of the liquid crystal and the polymer differ from each other. According to the above system, a transparent state superior to conventional ones can be obtained. In particular, a superior light-scattering state can also be obtained when applying an electric field by forming a twisted structure in which a liquid crystal and a polymer are twisted. Further, a liquid crystal display device having high quality and improved threshold characteristics can be realized. However, even in the above-mentioned improved polymer dispersed liquid crystal display device, a problem occurs in that the scattering performance is influenced by the materials used. In addition, concerning reliability, there is a problem in that a phenomenon (hereinafter referred to as "afterimage") occurs when an electric field is removed after being applied for a long time period, in which phenomenon the alignment direction of the liquid crystal does not relax to its original direction and the electric field-applied state, i. e., the light-scattering state, partially remains. In this case, afterimage is occasionally improved to some extent by mixing a bifunctional monomer having two functional groups in monomers which are used as precursors of a polymer to be compatibly dissolved in the liquid crystal. However, stable effects cannot be obtained.

In addition, different from the above-mentioned afterimage, other problems occur such that the transparent state deteriorates with the lapse of time and contrast decreases when the liquid crystal display device is exposed to high temperatures or electric fields are repeatedly applied to and removed from the device.

SUMMARY OF THE INVENTION

An object of the present invention is to provide a polymer dispersed liquid crystal electro-optical device and a method of manufacturing the same, which polymer dispersed liquid crystal electro-optical device achieves improved scattering performance and prevents afterimage and deterioration in the transparent state with the lapse of time.

A polymer dispersed liquid crystal electro-optical device comprises a liquid crystal polymer complex layer formed by compatibly dispersing a liquid crystal and a polymer and phase-separating the liquid crystal and the polymer, in which the liquid crystal and the polymer are aligned in the same direction when no electric field is applied; and an electrode structure formed on each side of the liquid crystal polymer complex layer for applying an electric field to the liquid crystal polymer complex layer to align the liquid crystal along the electric field so as to render the liquid crystal polymer complex layer in a light-scattering state. The liquid crystal polymer complex layer is formed by polymerizing a polymer precursor under such conditions that a compound in which at least one hydrogen atom in a benzene ring is substituted by a hydroxy group or a compound (hereinafter occasionally referred to as "additive") having a benzene ring with a hydroxy group as a basic skeleton is added to a solution compatibly dissolving the liquid crystal and the polymer precursor.

According to the polymer dispersed liquid crystal electro-optical device, the addition of the above-mentioned additive can significantly improve scattering performance during energizing as compared with that of devices not containing the additive, and also suppresses deterioration of a light-scattering state and a transparent state after energizing for a long time period, thereby improving display contrast.

It is preferred that the above mentioned compound in which at least one hydrogen atom in a benzene ring is substituted by a hydroxy group or the compound having a benzene ring with a hydroxy group as a basic skeleton is ditert-butylhydroquinone. The added amount of this compound is easily adjusted, since a great improvement is achieved in the display characteristics by its addition, and its solubility in the above-mentioned solution is relatively high.

Furthermore, the added amount of the above-mentioned ditert-butylhydroquinone with respect to the above-mentioned solution is preferably 0.0005 to 1% by weight, and more preferably, 0.001 to 0.1% by weight. When the added amount is within this range, the scattering performance can be particularly improved. Also, the refractive index and contrast after energizing for a long time period can be raised higher than that without addition of ditert-butylhydroquinone, in addition to suppressing reduction in polymerizing speed or an increase in residual monomer.

Hydroquinone can also be used for the above-mentioned additives. The added amount of hydroquinone with respect to the above-mentioned solution is preferably 0.0005 to 1% by weight, and more preferably, 0.005 to 0.1% by weight. By using hydroquinone within the above-mentioned range, heat polymerization of a polymer precursor can be suppressed, and the electro-optical characteristics and reliability of the electro-optical device produced is thereby improved.

DETAILED DESCRIPTION OF THE PREFERRED EMBODIMENTS

Next, a polymer dispersed liquid crystal electro-optical device and a method for manufacturing the same according to the present invention will be explained in more detail with reference to the accompanying drawings. The following embodiments relate to cases in which a polymer dispersed liquid crystal electro-optical device according to the present invention is applied to a reflective type liquid crystal display. The present invention is applicable to either transmissive types or reflective types and also can be applied to not only liquid crystal displays but also to other devices such as electro-optical shutters.

Figure 1:
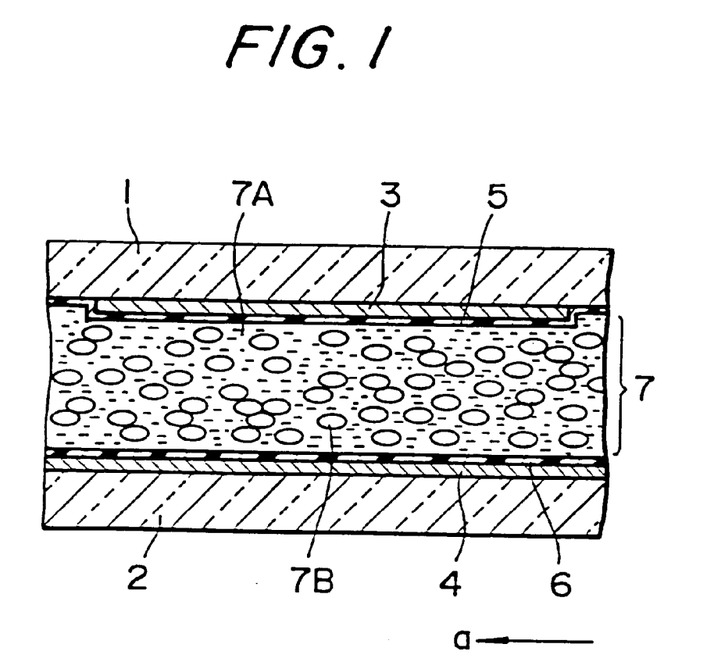
FIG. 1 is an enlarged fragmentary sectional diagram showing a structure of an embodiment of a polymer dispersed liquid crystal electro-optical device according to the present invention.

FIG. 1 is a sectional diagram showing a liquid crystal display of this embodiment. A transparent electrode 3 composed of ITO (Indium Tin Oxide), etc. is formed on the surface of a first transparent substrate 1 by depositing, sputtering, or the like. Meanwhile, on the surface of a second transparent substrate 2, a metallic electrode 4 is similarly formed which is composed of metals such as aluminum, chromium, etc. and which also serves as a reflective layer. A first alignment layer 5 and a second alignment layer 6, both of which are made of polyimide, polyvinyl alcohol, etc., are formed on the surface of the first transparent substrate 1 and the transparent electrode 3 and the surface of the first transparent substrate 2 and the transparent electrode 4, respectively; and each of the alignment layers 5 and 6 is rubbed in its predetermined direction. In the case of FIG. 1, rubbing is carried out in the direction of the arrow a shown in the figure. In addition, rubbing may also be performed directly on the surface of a transparent substrate, on which no alignment layer is formed. Furthermore, concerning the direction of rubbing, the rubbing direction is shifted between the first alignment layer 5 and the second alignment layer 6 according to a twist-angle when a liquid crystal and a polymer are rendered in a twisted state, as is mentioned in the latter.

The solution mentioned below compatibly dissolving a liquid crystal, a polymer precursor, and a specific additive is sealed in a liquid crystal cell composed of the two transparent substrates 1 and 2 which are held at a predetermined distance (e. g., 5 to 10 fÊm) using a sealant or spacers not shown in the figure.

A liquid crystal having refractive anisotropy and dielectric anisotropy, for example, a nematic liquid crystal, is used for this solution. As the polymer precursor, those which are compatibly dissolved and dispersed with a liquid crystal and which result in a solution exhibiting a liquid crystal phase are used. In addition, the polymer precursor is a monomer forming a polymer due to polymerization; and the preferred examples thereof are those polymers, into which a benzene skeleton, preferably a biphenyl skeleton, a terphenyl skeleton, or a quarterphenyl skeleton is introduced, and derivatives thereof. Moreover, polymers not having benzene skeletons can be similarly used when they can be aligned with a liquid crystal, in other words, as long as they have similar refractive anisotropy to liquid crystals. When a polymer has a benzene skeleton, the refractive index of the polymer can be adjusted by changing, for example, the number of phenyl groups or the type of substituents bonding to the phenyl group.

Practical examples of polymer precursors are esters of biphenylmethanol or naphthol and methacrylic acid or acrylic acid, and derivatives thereof. In addition, ester derivatives of biphenol and methacrylic acid or acrylic acid may be mixed therewith. Furthermore, a-methylstyrene, epoxy compounds, and the like may be used as other polymer precursors.

According to a method of phase-separating a liquid crystal and a polymer under dispersed conditions, a liquid crystal and a polymer precursor are compatibly dissolved once and then formed into a polymer by polymerizing the polymer precursor. For this polymerization, photo-polymerization at a predetermined temperature is preferably employed, as is mentioned later.

In this embodiment, a specific additive, that is, a compound in which at least one hydrogen atom in a benzene ring is substituted by a hydroxy group or a compound having a benzene ring with a hydroxy group as a basic skeleton, is added to the above-mentioned solution prepared by compatibly dissolving a liquid crystal and a polymer precursor. Examples of such compounds are divalent phenols, such as hydroquinone, catechol, and resorcinol; and monovalent, trivalent, or higher than trivalent phenols in which hydrogen atoms in a benzene ring are similarly substituted by a hydroxy group. Furthermore, compounds in which other substituents bond to these phenol compounds are included in the above-mentioned compounds, for example, compounds having the following chemical formula 1 or 2. An example of compounds having the chemical formula 1 is ditert-butylhydroquinone (hereinafter referred to as "BHQ") and an example of compounds having the chemical formula 2 is paratertbutylcatechol.

(Chemical Formula 1)

wherein m+n=3 and m'+n'=3.

(Chemical Formula 2)

wherein m"+n"=3.

The solution to which the above-mentioned compound has been added is sealed in a liquid crystal cell and then a polymer precursor within the cell is polymerized. In practical mass production processes, it is frequently impossible to carry out photo-polymerization immediately after sealing the solution in a liquid crystal cell. In such cases, the present invention is advantageous. For example, an electro-optical device without any deteriorated characteristic can be manufactured, even when a mixture of a liquid crystal, a polymer precursor, and an additive is photo-polymerized two weeks after leaving the mixture sealed in a liquid crystal cell. When polymerization is carried out approximately 1 week after sealing a liquid crystal/polymer precursor without employing any additive such as BHQ used in the present invention, scattering performance of the resulting electro-optical device decreases.

Although heat polymerization, photo-polymerization, or the like can be employed as the polymerization method, in general, photo-polymerization is preferable considering liquid crystal materials. The most frequently used method is such that ultraviolet radiation is employed for polymerization using an ultraviolet curing polymer. According to this method, since the intensity of light, radiation time, and environmental temperature of ultraviolet radiation affect the driving and optical characteristics of liquid crystal displays, the intensity of light, radiation time, and environmental temperature required for obtaining preferable characteristics are predetermined by experiment. The lower limit of the radiation time is set to a time during which the amount of monomer left in the resulting liquid crystal polymer complex layer is sufficiently reduced. In addition, the polymer precursor content with respect to the solution is preferably 3 to 10% by weight, and more preferably, 5 to 8% by weight. Polymerization initiators can be used for polymerization, depending on necessity.

A polymer produced by photo-polymerization in this polymerizing process phase-separates from the solution, thus when polymerization proceeds and finally leads to a decrease in the amount of residual monomer, a liquid crystal polymer complex layer 7 is formed in which numerous polymer particles 7B are dispersed in a liquid crystal 7A, as is shown in FIG. 1.

Since the liquid crystal polymer complex layer 7 produced as above is in contact with alignment layers 5 and 6 rubbed in the direction of arrow a in the figure, it is fundamentally aligned in the direction of arrow a. This is because a solution exhibiting a liquid crystal phase before a polymerization process is in contact with the alignment layers 5 and 6. Thus, molecules of the liquid crystal and the polymer precursor in the solution are aligned beforehand along the rubbing direction of the alignment layers 5 and 6, and a polymer is formed by photo-polymerization while maintaining the alignment direction after the above-mentioned polymerization process. For rendering a liquid crystal and a polymer in a twisted state, the upper portion of the liquid crystal polymer complex layer 7 is aligned in the rubbing direction of the first alignment layer 5 and the lower portion of the liquid crystal polymer complex layer 7 is aligned in the rubbing direction of the second alignment layer 6 so that a predetermined twist angle is formed.

In this condition, that is, a condition in which the liquid crystal 7A and the polymer particles 7B are aligned in the same direction without applying a voltage to the transparent electrode 3 and the metallic electrode 4, as is above-mentioned, the liquid crystal 7A and the polymer particles 7B are set to have almost the same refractive index. Therefore, the liquid crystal polymer complex layer 7 is in a transparent state when no electric field is applied thereto.

Figure 2:
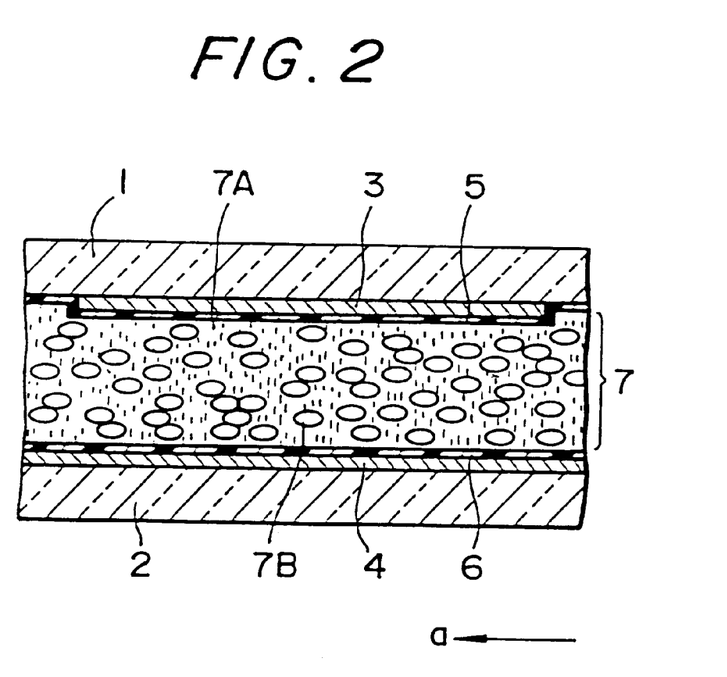
FIG. 2 is an enlarged sectional diagram showing a structure under an energizing condition in the embodiment shown in FIG. 1.

However, when a voltage not less than a predetermined threshold voltage is applied between the transparent electrode 3 and the metallic electrode 4, only the liquid crystal 7A having dielectric anisotropy is rendered in a different alignment state by the electric field, as is shown in FIG. 2. In this case, if the liquid crystal has positive dielectric anisotropy, the liquid crystal 7A is aligned in the direction of the electric field, as is shown in the figure. Since the liquid crystal 7A has refractive dielectric anisotropy, the refractive indexes of the liquid crystal 7A and the polymer particles 7B differ from each other when the alignment direction of the liquid crystal 7A changes. Thus, the liquid crystal polymer complex layer 7 is rendered in a light-scattering state in which light entering through the first transparent substrate 1 is scattered.

Incidently, this type of liquid crystal display generally deteriorates in transparency when exposed to certain high temperatures or afterimage occurs so that the display remains in an ON state when left in the ON state for a long time period. Therefore, the driving and optical characteristics after heat-aging treatment (heat-aging characteristics), in which a liquid crystal display is held for a long time period while heated to a predetermined temperature, and the driving and optical characteristics after energize-aging treatment (energize-aging characteristics), in which a liquid crystal display is held for a long time period while a predetermined driving voltage is applied thereto, are important.

In practical use, both the above-mentioned heat-aging treatment and energize-aging treatment are supposed to have influence, thus it is necessary for evaluation to employ both of them in combination. According to a liquid crystal display of the present invention, the effect due to heat-aging treatment is small, and further, the energize-aging characteristics are improved compared with conventional liquid crystal displays, i. e., those to which one of the above-mentioned additives is not added.

Although the amount of the above-mentioned additive varies according to the type of additive, 0.0005 to 1.0% by weight with respect to the solution is preferable. When the amount of additive is less than this range, an effect by its addition cannot be obtained. Meanwhile, if the added amount exceeds the above range, polymerization of the polymer precursor is suppressed, thereby a long time period is occasionally required for the polymerization steps or deterioration in the driving or optical characteristics occurs. This is because the above-mentioned additives function as polymerization suppressors for polymerizing polymers incorporated in the present invention.

The added amount of the above-mentioned additive is is also limited by its solubility in the above-mentioned solution. For example, as compared with the above-mentioned hydroquinone, the above-mentioned BHQ has a higher solubility in a typical used solution and the added amount thereof is more easily adjusted.

Moreover, the type of the above-mentioned additive causes various limitations. For example, even with a trace amount added, as is mentioned above, certain types of compounds may affect the display characteristics. Thus, it is necessary to change the compound or limit the added amount in such cases. Examples of compounds having small influence on the display characteristics are the above-mentioned hydroquinone and BHQ.

Next, more practical examples of the present invention will be explained.

EXAMPLES

Example 1

Each of the solutions used as the above-mentioned solution was prepared such that 7% by weight of a polymer precursor was compatibly dissolved in a liquid crystal and BHQ was further added thereto at 0% by weight, 0.001% by weight, 0.01% by weight, 0.1% by weight, and 1% by weight, and evaluation was carried out on the resulting solutions. TL215B (Product No., manufactured by Merck Japan Limited) was used as a liquid crystal and a mixture of biphenylmethacrylate and bisphenol A dimethacrylate at a weight ratio of 11:1 was used as a polymer precursor. Although the following results were obtained from experiments using liquid crystal cells composed of these materials, similar results were obtained when BL007 (Product No., manufactured by Merck Japan Limited) was used as a liquid crystal and 6% by weight of a mixture of terphenylmethacrylate and p,p"-biphenyldimethacrylate at a weight ratio of 4:1 was added thereto as a polymer precursor.

A 5 mm thick cell in which a chromium electrode was formed as the metallic electrode 4 and the twist angle of the liquid crystal polymer complex layer 7 was set to 90° was used as the liquid crystal cell. The above-mentioned solution was sealed in this liquid crystal cell and photo-polymerized by ultraviolet radiation. In the photo-polymerizing process, liquid crystal polymer complex layers 7 were formed at an environmental temperature of 50° C. under either of the following two conditions: radiation at a light intensity of 3 mW for 10 min. (case 1) and radiation at a light intensity of 20 mW for 200 seconds (case 2).

The thus produced samples of case 1 and case 2 were first subjected to heat-aging treatment at 70° C. The heating time was 15 hours for the sample of case 1 and 120 hours for the sample of case 2. The samples were then subjected to energize-aging treatment at 50° C. for 15 hours. The applied voltage was 5 V for the sample of case 1 and 4 V for the sample of case 2, considering the relation to the threshold voltage.

Figure 3:
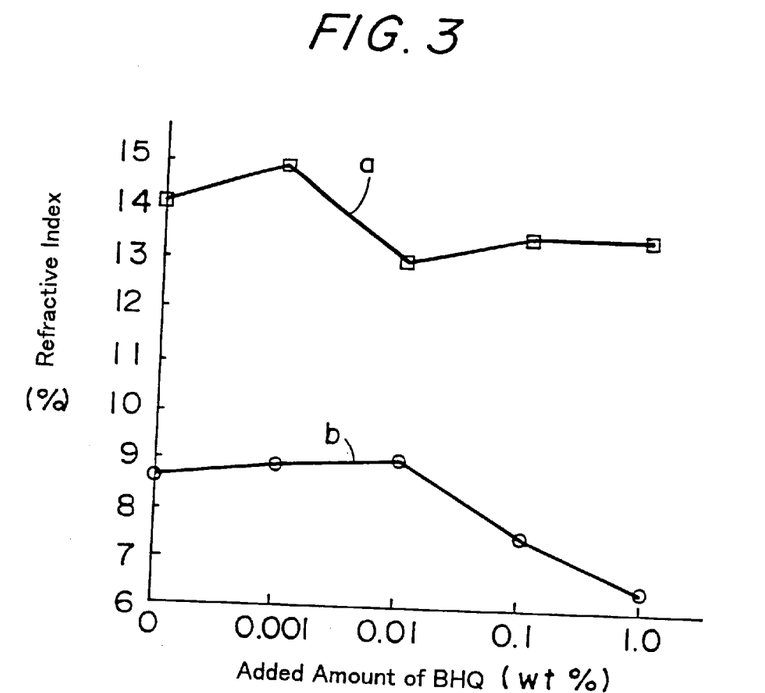
FIG. 3 shows the relationship between the refractive index under an energizing condition and the added amount of BHQ in a polymer dispersed liquid crystal electro-optical device of Example 1 incorporated in the present invention after treating with heat-aging and energize-aging.
Figure 4:
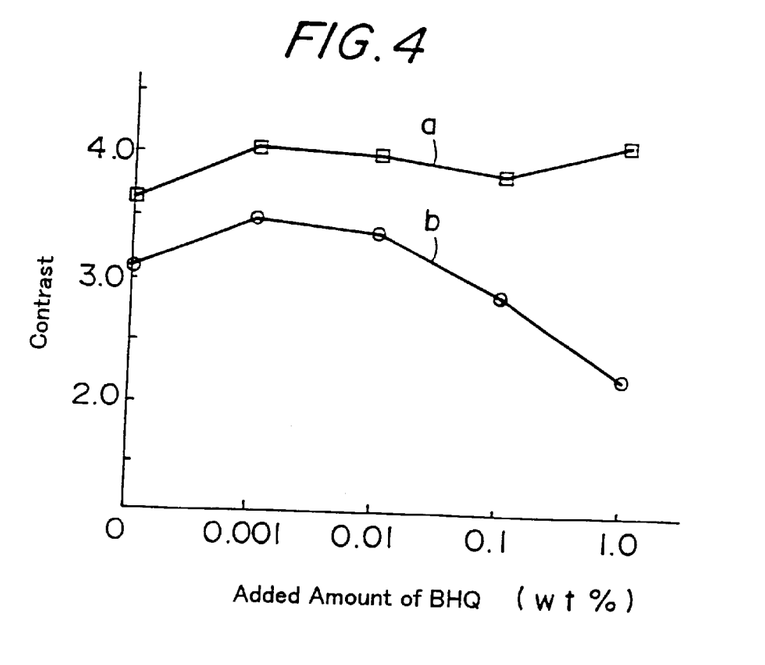
FIG. 4 shows the relationship between contrast and the added amount of BHQ in Example 1 after treating with heat-aging and energize-aging.

FIG. 3 shows a dependency of the refractive index on the added amount of BHQ when applying a voltage (an ON state) in the above-mentioned cases 1 and 2 after heat-aging treatment and energize-aging treatment. In FIG. 3, case 1 is indicated by a and case 2 is indicated by b. Furthermore, FIG. 4 shows a dependency of contrast on the added amount of BHQ. In FIG. 4, case 1 is indicated by a and case 2 is indicated by b.

It is understood from FIGS. 3 and 4 that the refractive index and contrast are improved when certain amounts of BHQ are added as compared with those without addition. Although varying according to conditions, an effective added amount of BHQ ranges from 0.0005 to 0.1% by weight when subjected to the above-mentioned aging, more preferably, from 0.001 to 0.1% by weight, and further more preferably, from 0.001 to 0.01% by weight.

Figure 5:
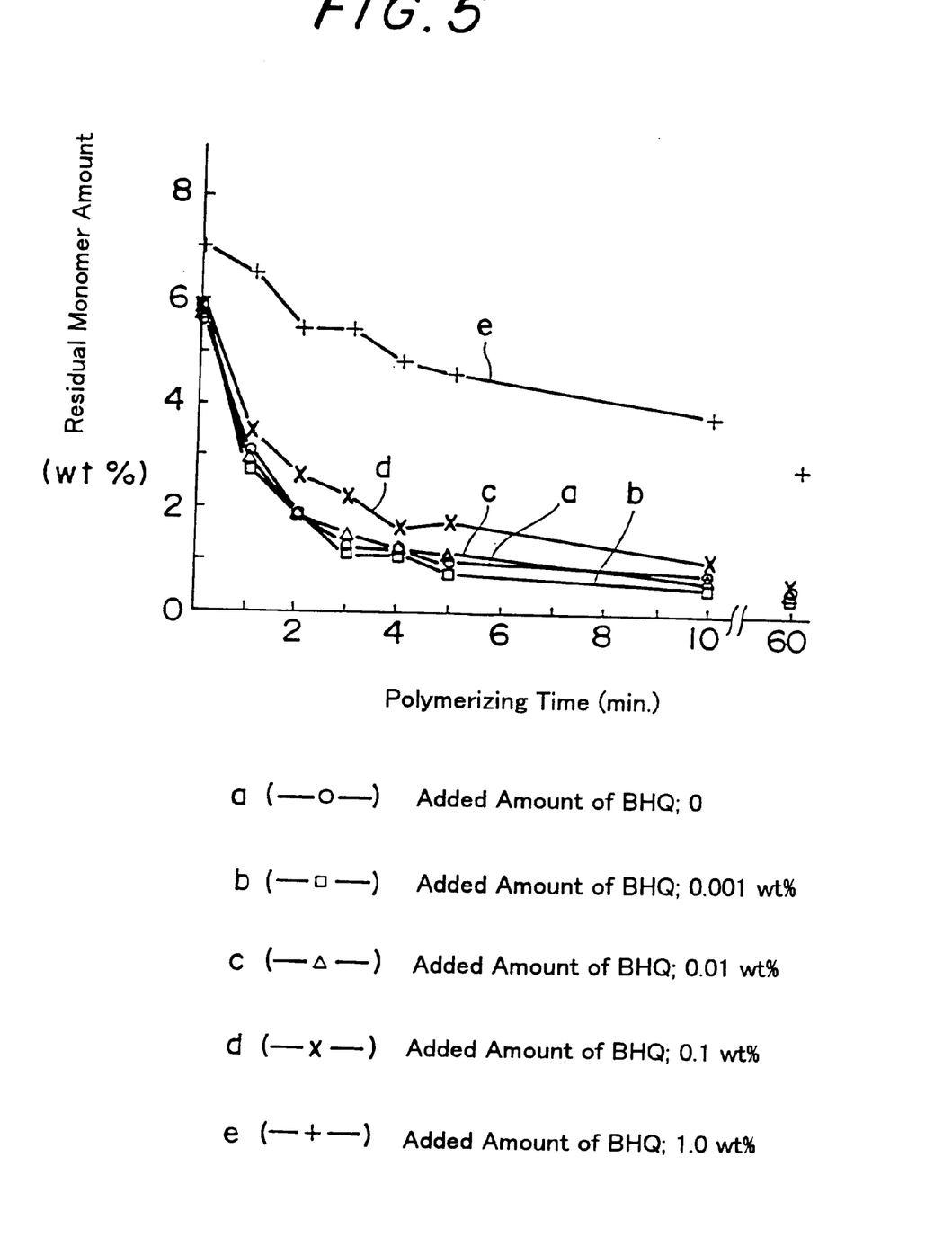
FIG. 5 shows the relationship between the amount of residual monomer and the polymerizing time for each added amount of BHQ in Example 1.

FIG. 5 shows a dependency of the amount of residual monomer in the liquid crystal polymer complex layer 7 of case 1 on the polymerizing time for each added amount of BHQ. When the amount of residual monomer is large, both the driving characteristics and the optical characteristics deteriorate, thereby reducing stability of the liquid crystal polymer complex layer. It is understood from this figure that until the added amount of BHQ reaches 0.1% by weight, the polymerizing speed and the final amount of residual monomer do not greatly change, and when the added amount of BHQ exceeds 0.1% by weight, the polymerizing speed decreases and the amount of residual monomer increases. Therefore, the upper limit of the added amount of BHQ is approximately 0.1% by weight from the viewpoint of polymerizing speed and amount of residual monomer.

Although afterimage and a reduction in contrast associated with the energize-aging can be suppressed if a liquid crystal polymer complex layer is formed by adding BHQ to a solution, as is above mentioned, clear reasons for this phenomenon have not yet been obtained. However, the above-mentioned additives function as polymerization suppressors when a certain amount thereof is added. Thus, it is possible that they alter the polymerization conditions of polymer precursors. Electron microscopic photographs of the liquid crystal polymer complex layers of the above-mentioned example show the following: in samples exhibiting clear effects, to which samples 0.001% by weight or 0.01% by weight of BHQ was added, a small gel portion in the shape of a film covering the polymer is observed and clear polymer particles are visually confirmed; meanwhile, in samples prepared without adding BHQ, a large gel portion is observed and the linked polymer particles are covered with a film-like material. The polymer particles are in the shape of particles having an almost oval sectional form. Although the size of the polymer particles varies according to monomers and reaction conditions, for example, the size is 0.1 to 0.5 mm in the uniaxial direction and 2 to 10 mm in the direction of major axis.

Example 2

In this Example, a mixture of BL007 manufactured by Merck Japan Limited and RDP50614 manufactured by RODIC Co., Ltd. at a weight ratio of 1:1 was used as a liquid crystal, and 0.3% by weight of R1011 manufactured by Merck Japan Limited was added thereto as a chiral component. With respect to the liquid crystal, 6% by weight of a mixture of fluoroterphenylmethacrylate and biphenyldimethacrylate at a weight ratio of 4:1 was used as a polymer precursor. The relationship between the added amount of BHQ and the electro-optical characteristics was investigated in this material system. A 5 mm thick cell was used which had an alignment layer thickness of 30 nm and an alignment direction of 180°. The above-mentioned mixture of liquid crystal/polymer precursor and BHQ were sealed in the empty cell and polymerized by black light having an ultraviolet intensity of 3.3 mW/cm$^2$ (350 nm) at 50° C. for 10 min. so as to manufacture an electro-optical device. The BHQ concentration varied between 0 and 0.1% by weight.

Figure 6:
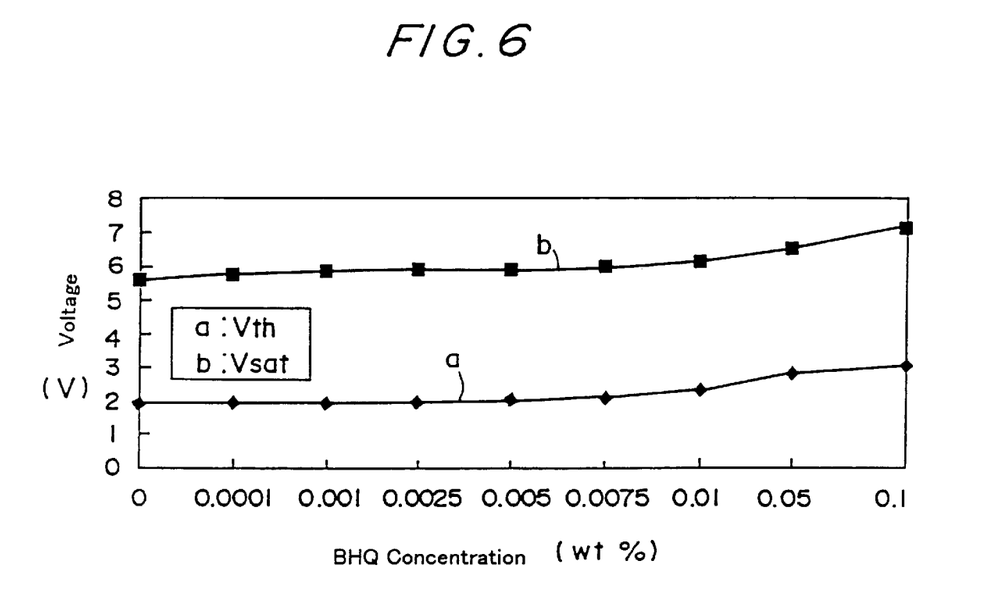
FIG. 6 shows the relationship between the added amount of BHQ and the driving voltage in a polymer dispersed liquid crystal electro-optical device of Example 2 according to the present invention.
Figure 7:
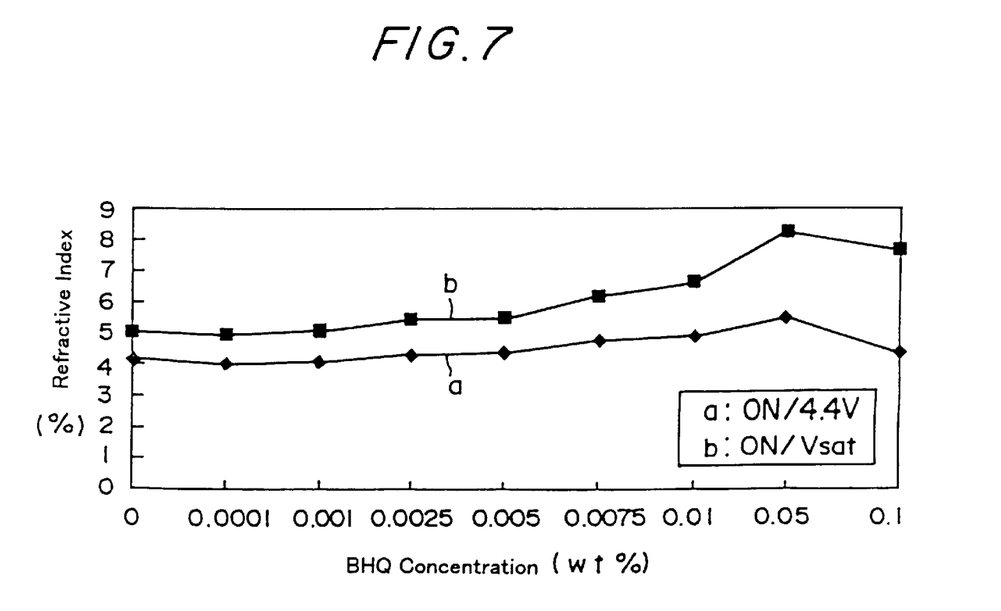
FIG. 7 shows the relationship between the added amount of BHQ and the ON refractive index in Example 2.

FIG. 6 shows the relationship between the BHQ concentration and the driving voltage and FIG. 7 shows the relationship between the BHQ concentration and the refractive index in the ON state. In FIG. 6, a line indicated by a shows changes in the threshold voltage and a line indicated by b shows changes in the saturated voltage. In FIG. 7, a line indicated by a shows changes in the refractive index at an ON voltage of 4.4 V and a line indicated by b shows changes in the refractive index at a saturated voltage.

It is understood from FIG. 6 that both the threshold voltage and the saturated voltage are almost constant when the BHQ concentration is low and the threshold voltage and the saturated voltage gradually increase when the BHQ concentration is greater than 0.01% by weight. In addition, it is understood from FIG. 7 that the refractive index at the ON and saturated voltages gradually increases with a rise in the BHQ concentration and reaches a maximum value when the BHQ concentration is 0.05% by weight.

Example 3

This example was carried out similarly to Example 2, except that hydroquinone (HQ) was employed instead of BHQ used in Example 2. The relationship between the added amount of HQ and the electro-optical characteristics was investigated in a similar manner to Example 2.

Figure 8:
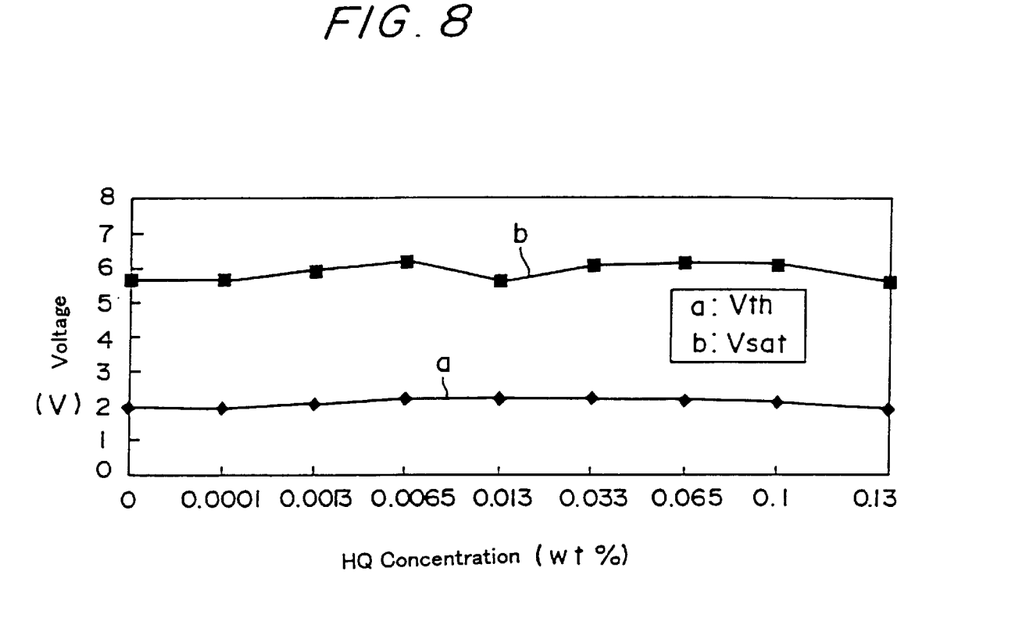
FIG. 8 shows the relationship between the added HQ amount and the driving voltage in a polymer dispersed liquid crystal electro-optical device of Example 3 according to the present invention.
Figure 9:
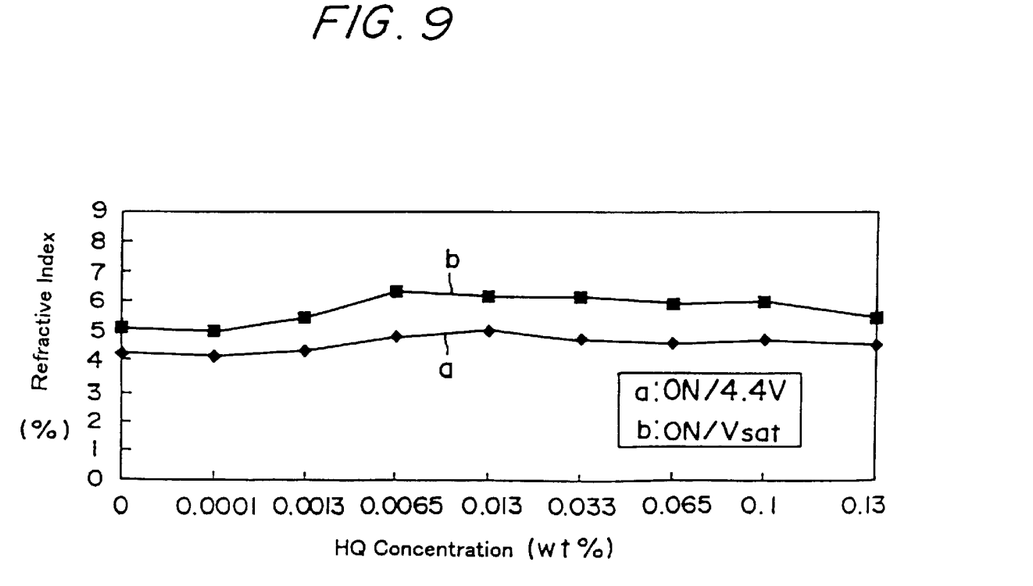
FIG. 9 shows the relationship between the added HQ amount and the refractive index in Example 3.

FIG. 8 shows the relationship between the HQ concentration and the driving voltage and FIG. 9 shows the relationship between the HQ concentration and the refractive index in an ON state. In FIG. 8, a line indicated by a shows changes in the threshold voltage and a line indicated by b shows changes in the saturated voltage. In FIG. 9, a line indicated by a shows changes in the refractive index at an ON voltage of 4.4 V and a line indicated by b shows changes in the refractive index at a saturated voltage.

It is understood from FIG. 8 that both the threshold voltage and the saturated voltage are almost constant even when the HQ concentration changes. In addition, it is understood from FIG. 9 that the refractive indexes at the ON voltage and the saturated voltage increase in a BHQ concentration range of 0.005 to 0.1% by weight.

What is claimed is:

1. A polymer dispersed liquid crystal electro-optical device, comprising:

a liquid crystal polymer complex layer comprising a liquid crystal material and a polymer, wherein said liquid crystal material and said polymer are aligned in the same direction when no electric field is applied; and an electrode structure formed on each side of said liquid crystal polymer complex layer for applying an electric field to said liquid crystal polymer complex layer to align said liquid crystal material along the electric field so as to render said liquid crystal polymer complex layer in a light-scattering state;

wherein said liquid crystal polymer complex layer is formed by:

dissolving a liquid crystal material and a polymer precursor to form a solution;

adding butylhydroquinone to said solution in a range of 0.0005–0.1% by weight with respect to said solution;

polymerizing said polymer precursor to form a polymer; and phase separating said liquid crystal material and said polymer to form a liquid crystal polymer complex layer.

2. A method for manufacturing a polymer dispersed liquid crystal electro-optical device, comprising:

dissolving a liquid crystal material and a polymer precursor to form a solution;

adding butylhydroquinone to said solution in a range of 0.0005–0.1% by weight with respect to said solution;

radiating said solution with light, thereby photopolymerizing said polymer precursor to form a polymer; and phase separating said liquid crystal material and said polymer to form a liquid crystal polymer complex layer.

3. A polymer dispersed liquid crystal electro-optical device, comprising:

a liquid crystal polymer complex layer comprising a liquid crystal material and a polymer, wherein said liquid crystal material and said polymer are aligned in the same direction when no electric field is applied; and an electrode structure formed on each side of said liquid crystal polymer complex layer for applying an electric field to said liquid crystal polymer complex layer to align said liquid crystal material along the electric field so as to render said liquid crystal polymer complex layer in a light-scattering state;

wherein said liquid crystal polymer complex layer is formed by:

dissolving a liquid crystal material and a polymer precursor to form a solution;

adding hydroquinone to said solution in a range of 0.005–0.1% by weight with respect to said solution;

polymerizing said polymer precursor to form a polymer; and phase separating said liquid crystal material and said polymer to form a liquid crystal polymer complex layer.

4. A method for manufacturing a polymer dispersed liquid crystal electro-optical device, comprising:

dissolving a liquid crystal material and a polymer precursor to form a solution;

adding hydroquinone to said solution in a range of 0.005–0.1% by weight with respect to said solution;

radiating said solution with light, thereby photopolymerizing said polymer precursor to form a polymer; and phase separating said liquid crystal material and said polymer to form a liquid crystal polymer complex layer.

* * * * *